(12) United States Patent
Stevenson et al.

(10) Patent No.: US 10,465,908 B2
(45) Date of Patent: *Nov. 5, 2019

(54) COMBUSTION STAGING SYSTEM (71) Applicant: ROLLS-ROYCE plc, London (GB)

(72) Inventors: Andrew Stevenson, Ashbourne (GB);
Graham Thompson, Birmingham (GB)

(73) Assignee: ROLLS-ROYCE plc, London (GB)

( * ) Notice: Subject to any disclaimer, the term of this patent is extended or adjusted under 35 U.S.C. 154(b) by 398 days.

This patent is subject to a terminal disclaimer.

(21) Appl. No.: 15/430,085

(22) Filed: Feb. 10, 2017

(65) Prior Publication Data

US 2017/0268781 A1    Sep. 21, 2017

(30) Foreign Application Priority Data

Mar. 18, 2016  (GB) .................................. 1604651.8

(51) Int. Cl.
*F23R 3/28* (2006.01)
*F02C 7/228* (2006.01)
(Continued)

(52) U.S. Cl.
CPC .............. *F23R 3/283* (2013.01); *F02C 7/228* (2013.01); *F02C 7/232* (2013.01); *F02C 9/263* (2013.01);
(Continued)

(58) Field of Classification Search
CPC ...... F02C 7/12; F02C 7/14; F02C 7/22; F02C 7/222; F02C 7/228; F02C 7/232;
(Continued)

(56) References Cited

U.S. PATENT DOCUMENTS

| 4,491,272 A | 1/1985 | Bradley et al. |
| 5,402,634 A | 4/1995 | Marshall |

(Continued)

FOREIGN PATENT DOCUMENTS

| EP | 1344916 A2 | 9/2003 |
| EP | 1 988 267 A2 | 11/2008 |

(Continued)

OTHER PUBLICATIONS

U.S. Appl. No. 15/428,005, filed Feb. 8, 2017 in the name of Thompson et al.

(Continued)

*Primary Examiner* — Arun Goyal
(74) *Attorney, Agent, or Firm* — Oliff PLC (57) ABSTRACT

A combustion staging system includes a splitting unit which receives a metered fuel flow and controllably splits the received fuel flow into pilot and mains flows. Pilot and mains fuel manifolds distribute fuel from the splitting unit to the pilot and mains stages. The splitting unit selects and deselects pilot-only operation. Both pilot and mains manifolds are selectable for pilot and mains operation. A cooling flow recirculation line has a delivery section arranged to provide a cooling flow of fuel to the mains manifold when it is deselected during pilot-only operation. Cooling flow enters the delivery section from a high pressure fuel zone of the engine and exits the return section to a low pressure fuel zone of the engine. A controller adjusts the splitting unit during pilot-only operation to partially select the mains manifold thereby increasing the pressure in the mains manifold to meet a target fuel pressure therein.

14 Claims, 7 Drawing Sheets

(51) Int. Cl.
*F02C 7/232* (2006.01)
*F02C 9/26* (2006.01)
*F02C 9/36* (2006.01)
*F23R 3/34* (2006.01)
*F02C 9/34* (2006.01)
*F23K 5/06* (2006.01)

(52) U.S. Cl.
CPC ............... *F02C 9/34* (2013.01); *F02C 9/36* (2013.01); *F23K 5/06* (2013.01); *F23R 3/34* (2013.01); *F23R 3/343* (2013.01); *F23R 3/346* (2013.01); *F23R 2900/00004* (2013.01); *Y02T 50/671* (2013.01)

(58) Field of Classification Search
CPC .... F02C 9/263; F02C 9/34; F02C 9/46; F23R 3/28; F23R 3/283; F23R 3/343; F23R 3/346
See application file for complete search history.

(56) References Cited

U.S. PATENT DOCUMENTS

| | | | |
|---|---|---|---|
| 5,735,117 A * | 4/1998 | Toelle | F02C 7/228 60/39.094 |
| 5,899,073 A | 5/1999 | Akimaru | |
| 9,404,423 B2 | 8/2016 | Griffiths et al. | |
| 2010/0263755 A1 | 10/2010 | Taylor et al. | |
| 2013/0042920 A1 | 2/2013 | Snodgrass et al. | |
| 2013/0061599 A1 | 3/2013 | Van Alen | |
| 2013/0259088 A1 | 10/2013 | Bellis et al. | |
| 2015/0027100 A1 | 1/2015 | Qin et al. | |
| 2016/0245524 A1 | 8/2016 | Hill | |

FOREIGN PATENT DOCUMENTS

| | | |
|---|---|---|
| EP | 2141340 A2 | 1/2010 |
| EP | 2339147 A2 | 6/2011 |
| EP | 2469057 A1 | 6/2012 |
| EP | 3070408 A1 | 9/2016 |
| GB | 2523126 A | 8/2015 |
| WO | 2013/036392 A1 | 3/2013 |
| WO | 2015/112515 A1 | 7/2016 |

OTHER PUBLICATIONS

U.S. Appl. No. 15/427,932, filed Feb. 8, 2017 in the name of Hill.
Apr. 26, 2019 U.S. Office Action issued in U.S. Appl. No. 15/428,005.
May 31, 2019 Office Action issued in U.S. Appl. No. 15/427,932.

* cited by examiner

COMBUSTION STAGING SYSTEM

FIELD OF THE INVENTION

The present invention relates to a combustion staging system for fuel injectors of a multi-stage combustor of a gas turbine engine.

BACKGROUND

Multi-stage combustors are used particularly in lean burn fuel systems of gas turbine engines to reduce unwanted emissions while maintaining thermal efficiency and flame stability. For example, duplex fuel injectors have pilot and mains fuel manifolds feeding pilot and mains discharge orifices of the injectors. At low power conditions only the pilot stage is activated, while at higher power conditions both pilot and mains stages are activated. The fuel for the manifolds typically derives from a pumped and metered supply. A splitter valve can then be provided to selectively split the metered supply between the manifolds as required for a given staging.

A typical annular combustor has a circumferential arrangement of fuel injectors, each associated with respective pilot and mains feeds extending from the circumferentially extending pilot and mains manifolds. Each injector generally has a nozzle forming the discharge orifices which discharge fuel into the combustion chamber of the combustor, a feed arm for the transport of fuel to the nozzle, and a head at the outside of the combustor at which the pilot and mains feeds enter the feed arm. Within the injectors, a check valve, known as a flow scheduling valve (FSV), is typically associated with each feed in order to retain a primed manifold when de-staged and at shut-down. The FSVs also prevent fuel flow into the injector nozzle when the supply pressure is less than the cracking pressure (i.e. less than a given difference between manifold pressure and combustor gas pressure).

Multi-stage combustors may have further stages and/or manifolds. For example, the pilot manifold may be split into two manifolds for lean blow-out prevention during rapid engine decelerations.

During pilot-only operation, the splitter valve directs fuel for burning flows only through the pilot fuel circuit (i.e. pilot manifold and feeds). It is therefore conventional to control temperatures in the stagnant (i.e. mains) fuel circuit to prevent coking due to heat pick up from the hot engine casing. One known approach, for example, is to provide a separate recirculation manifold which is used to keep the fuel in the mains manifold cool when it is deselected. It does this by keeping the fuel in the mains manifold moving, although a cooling flow also has to be maintained in the recirculation manifold during mains operation to avoid coking.

Figure 1:
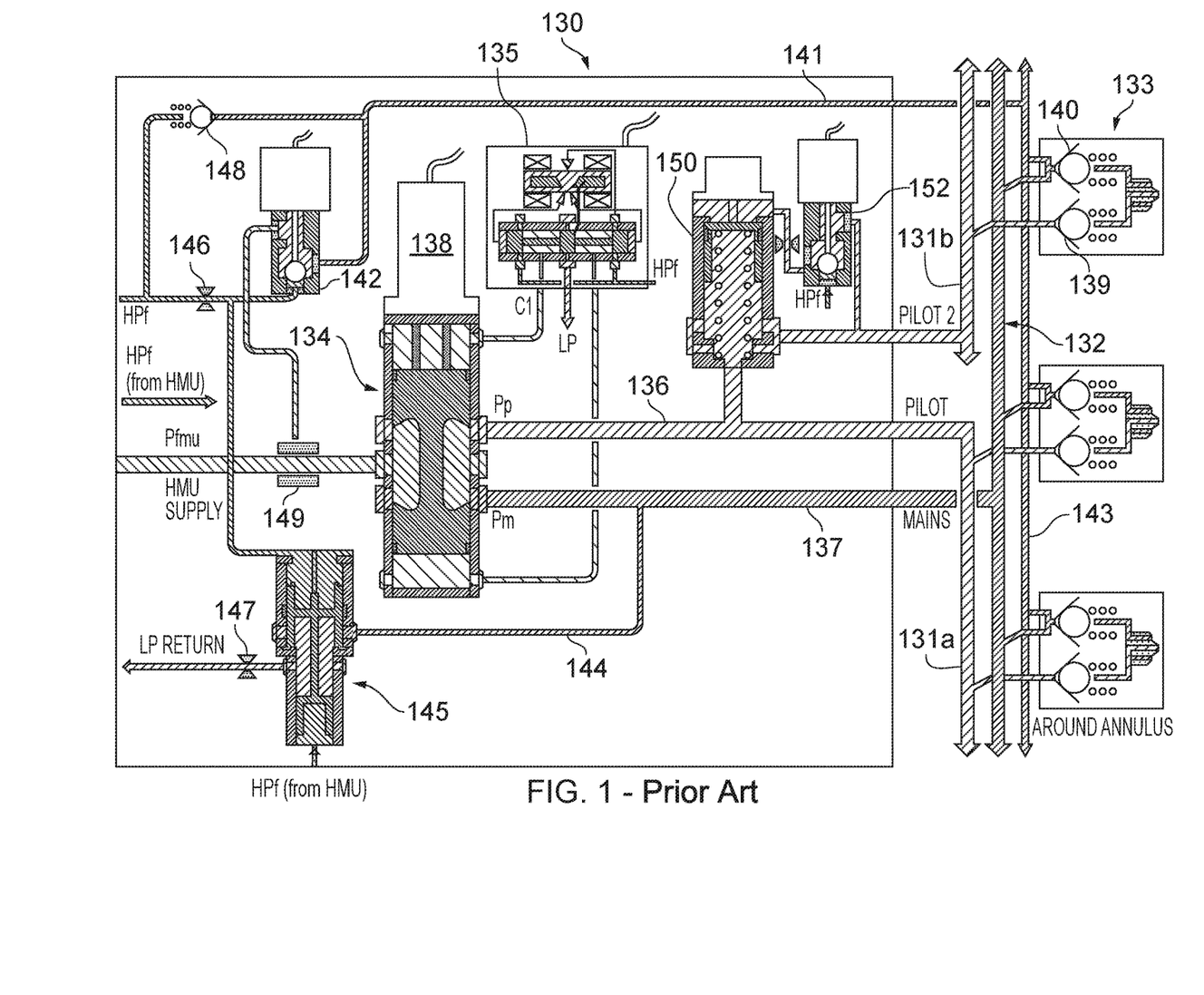
FIG. 1 shows schematically a combustion staging system for a gas turbine engine in pilot and mains operation mode.

FIG. 1 shows schematically a combustion staging system 130 for a gas turbine engine. A metered fuel flow arrives at the staging system at a pressure $P_{fmu}$. The staging system splits the fuel into two flows: one at a pressure $P_p$ for first 131a and second 131b segments of a pilot manifold and the other at a pressure $P_m$ for a mains manifold 132. Fuel injectors 133 of a combustor of the engine are split into two groups. The injectors of one group are connected to the first pilot manifold segment 131a, while the injectors of the other group are connected to the second pilot manifold segment 131b. The mains manifold feeds secondary nozzles of the fuel injectors. Pilot FSVs 139 and mains FSVs 140 at the injectors prevent combustion chamber gases entering the respective manifolds. By varying the fuel split between the manifolds, staging control of the engine can be performed.

In more detail, the staging system 130 has a fuel flow splitting valve (FFSV) 134, which receives the metered fuel flow from the HMU at pressure $P_{fmu}$. A spool is slidable within the FFSV under the control of a servo-valve 135, the position of the spool determining the outgoing flow split between a pilot connection pipe 136 which delivers fuel to the pilot manifold segments 131a, b and a mains connection pipe 137 which delivers fuel to the mains manifold 132. The spool can be positioned so that the mains stage is deselected, with the entire metered flow going to the pilot stage. An LVDT 138 provides feedback on the position of the spool to an engine electronic controller (EEC), which in turn controls staging by control of the servo-valve.

Between the FFSV 134 and the second pilot manifold segment 131b, the pilot connection pipe 136 communicates with a lean blow out protection valve 150 which controls communication between the pilot connection pipe 136 and the second pilot manifold segment 131b. The lean blow out protection valve is spring biased towards an open position. A solenoid operated control valve 152 is operable to apply a control pressure to the valve member of the lean blow out protection valve to move it against the action of the spring biasing to a closed position, interrupting the communication between the pilot connection pipe 136 and the second pilot manifold segment 131b, when required. Accordingly, if there is only a pilot delivery of fuel to the engine and there is a concern that a lean blow out condition may occur, the lean blow out protection valve 150 can be closed by appropriate control of the solenoid operated control valve 152, with the result that fuel delivery to the second pilot manifold segment 131b is restricted, whilst that to the first pilot manifold segment 131a is increased. Adequate pilot delivery can therefore be assured (albeit through a reduced number of the injectors 133), resulting in a reduced risk of a lean blow-out condition occurring.

The staging system 130 also has a recirculation line to provide the mains manifold 132 with a cooling flow of fuel when the mains manifold is deselected. The recirculation line has a delivery section including a delivery pipe 141 which receives the cooling flow from a fuel recirculating control valve (FRCV) 142, and a recirculation manifold 143 into which the delivery pipe feeds the cooling flow. The recirculation manifold has feeds which introduce the cooling flow from the recirculation manifold to the mains manifold via connections to the feeds from the mains manifold to the mains FSVs 140.

In addition, the recirculation line has a return section which collects the returning cooling flow from the mains manifold 132. The return section is formed by a portion of the mains connection pipe 137 and a branch pipe 144 from the mains connection pipe, the branch pipe extending to a recirculating flow return valve (RFRV) 145 from whence the cooling flow exits the recirculation line.

The cooling flow for the recirculation line is obtained from the HMU at a pressure $HP_f$ via a cooling flow orifice (CFO) 146. On leaving the RFRV 145 via a pressure raising orifice (PRO) 147, the cooling flow is returned to the pumping unit for re-pressurisation by the HP pumping stage. A check valve 148 accommodates expansion of fuel trapped in the pilot and mains system during shutdown when the fuel expands due to combustor casing heat soak back. The check valve can be set to a pressure which prevents fuel boiling in the manifolds. The FRCV 142 and the RFRV 145 are operated under the control of the EEC. The HMU also supplies fuel at pressure HP$_f$ for operation of the servo-valve 135, the RFRV 145, and the lean blow out protection valve 150.

When the mains is staged in, a cooling flow is also directed through the recirculation manifold 143 to avoid coking therein. More particularly a small bypass flow is extracted from the HMU's metered fuel flow at pressure P$_{fmu}$. The bypass flow is sent via a flow washed filter 149 to a separate inlet of the FRCV 142, and thence through the delivery pipe 141 to the recirculation manifold 143. The bypass flow exits the recirculation manifold to rejoin the mains fuel flow at the injectors 133.

In such a system, the fuel pressure in the mains manifold needs to be maintained above the combustion chamber gas pressure (which can be taken to be approximately the same as the measured engine parameter P30—the high pressure compressor outlet pressure) to prevent P30 gas ingestion into the fuel system, which is a potentially hazardous failure mode. In pilot-only mode in particular, it can be problematic to meet this pressure requirement across the operating envelope of the system due to variation in the tolerances of the CFO 146 and the PRO 147.

A further complication can be system pressure ripple which acts to reduce the available margins as it is proportional to the manifold pressure, which increases with total fuel flow.

SUMMARY

It would be desirable to address these problems.

Accordingly, in a first aspect, the present invention provides a combustion staging system for fuel injectors of a multi-stage combustor of a gas turbine engine, the system including:
- a splitting unit which receives a metered fuel flow and controllably splits the received fuel flow into pilot and mains flows for injecting respectively at pilot and mains fuel stages of the injectors to perform staging control of the combustor; and
- pilot and mains fuel manifolds respectively distributing fuel from the splitting unit to the pilot and mains stages;
- wherein the splitting unit (e.g. splitting valve) is operable to select the pilot manifold and deselect the mains manifold for pilot-only operation in which there is a pilot supply to the combustor but no mains supply to the combustor from the injectors, and is operable to select both the pilot and mains manifolds for pilot and mains operation in which there are pilot and mains supplies to the combustor from the injectors;
- wherein the system further includes a cooling flow recirculation line having a delivery section arranged to provide a cooling flow of fuel to the mains manifold when it is deselected during pilot-only operation so that the deselected mains manifold remains primed with relatively cool fuel, and a return section arranged to collect the cooling flow from the mains manifold;
- wherein the cooling flow enters the delivery section from a high pressure fuel zone of the engine and exits the return section to a low pressure fuel zone of the engine; and
- wherein the system further includes a controller which is adapted to adjust the splitting unit during pilot-only operation to partially select the mains manifold thereby increasing the pressure in the mains manifold to meet a target fuel pressure therein.

Thus in contrast to the system shown in FIG. 1, improved control of the fuel pressure in the mains manifold during pilot-only operation can be obtained by appropriate control of the splitting unit.

In a second aspect, the present invention provides a gas turbine engine having the combustion staging system according to the first aspect.

Optional features of the invention will now be set out. These are applicable singly or in any combination with any aspect of the invention.

The high pressure fuel zone may be downstream of a pumping unit of the engine. Typically the metered fuel flow derives from the same high pressure fuel zone. The low pressure fuel zone may be upstream of such a pumping unit.

The controller can be an element of an engine electronic controller (EEC). Typically, the controller selects a target pressure which ensures that the mains manifold fuel pressure remains above gas pressure in the combustor.

The fuel injectors may have mains check valves (e.g. integrated check valves) which are arranged to open when the fuel pressure within the mains manifold exceeds a predetermined fuel pressure relative to gas pressure in the combustor. In this case, the controller may select a target pressure during pilot-only operation which ensures that the mains manifold fuel pressure remains below the predetermined fuel pressure relative to gas pressure in the combustor. In this way, leakage through the check valves can be avoided. Rather, the pressure-raising fuel flow diverted from the pilot manifold into the mains manifold during pilot-only operation by the partial selection of the mains manifold can exit to the low pressure fuel zone of the engine via the return section of the cooling flow recirculation line.

The system may further include a pressure sensor which measures the mains manifold fuel pressure, the controller performing feedback control based on the measured pressure to meet the target fuel pressure.

The controller may be adapted to adjust the splitting unit during pilot-only operation to partially select the mains manifold such that the maximum mains flow from the splitting unit is 2% or less, and preferably 1% or less, of the total metered flow received by the splitting unit. When the pressure-raising flow sent through the mains manifold exits the return section of the cooling flow recirculation line to the low pressure fuel zone of the engine this reduces the supply to the combustor, but by ensuring that the reduction is only a small percentage of the total metered flow, impact on engine performance can be reduced. Indeed, although any reduction in fuel flow to the engine results in a reduction in engine thrust, the controller (e.g. the EEC) typically has an engine thrust control loop that automatically compensates for a drop in thrust by increasing the total fuel flow so that engine performance is not impacted.

The cooling flow may enter the delivery section from the high pressure fuel zone of the engine at a cooling flow orifice and exit the return section to the low pressure fuel zone of the engine at a pressure raising orifice. Advantageously, partial selection of the mains manifold to meet the target fuel pressure during pilot-only operation allows the cooling flow and pressure raising orifices to have less exacting performance requirements. The system may further include a fuel recirculating control valve on the delivery section adjacent the cooling flow orifice, the fuel recirculating control valve having an open position so that the cooling flow enters the delivery section at the cooling flow orifice during pilot-only operation, and a shut off position which prevents the cooling flow entering the delivery section through the cooling flow orifice during pilot and mains operation. The system may further include a recirculating flow return valve on the return section adjacent the pressure raising orifice, the recirculating flow return valve having an open position so that the cooling flow exits the return section at the pressure raising orifice during pilot-only operation, and a shut off position which prevents the cooling flow exiting the return section through the pressure raising orifice during pilot and mains operation. For example, the fuel recirculating control valve and the recirculating flow return valve may be operably connected such that when the fuel recirculating control valve moves to its open position the recirculating flow return valve likewise moves to its open position, and when the fuel recirculating control valve moves to its shut off position the recirculating flow return valve likewise moves to its shut off position.

In a staging system such as that shown in FIG. 1, the split between pilot and mains flow that can be achieved is limited by the size of the restriction in the FRCV 142. More particularly, the FRCV 142 is a bi-stable valve which is either open to receive the cooling flow via the CFO 146, or closed to receive the bypass flow at $P_{fmu}$. In pilot-only mode the FRCV 142 is open. Most of the flow into the staging system 130 from the HMU enters the FFSV 134 and is directed through the pilot manifold segments 131a, b to be expelled into the combustion chamber through the pilot fuel stages of the injectors 133. However, a proportion of the fuel from the HMU at pressure $HP_f$ enters the FRCV 142 via the CFO 146 and is circulated through the recirculation line for cooling the mains manifold 132. In this way the mains manifold is kept "primed" with fuel. For pilot and mains operation (shown in FIG. 1) the FRCV 142 is closed, and the mains FSVs 140 are opened to direct flow into the combustion chamber through the mains fuel stages of the injectors 133. The minimum flow through mains is the bypass flow extracted via the flow washed filter 149, this flow being determined by the flow number of the restriction in the FRCV 142. This restriction is sized to balance the need to have an adequate cooling flow through the orifice 146 in pilot-only mode and the need to have an adequate flow down the recirculation line during pilot and mains operation. Typically, at minimum flow through mains, 30% of the fuel (fixed) is sent to mains and 70% to pilot at minimum flow through mains. A greater split to mains, compared to pilot, is then achieved by movement of the FFSV 134 to couple the HMU supply to both the pilot manifold segments 131a, b and the mains manifold 132. It would be desirable to be able to control the fuel split during pilot and mains operation to allow a lower minimum flow through mains, but without negatively impacting the amount of cooling flow during pilot-only mode.

Accordingly, the splitting unit of the system of the present invention may be configured to divert a portion of the mains flow into the delivery section during pilot and mains operation, the diverted portion re-joining the rest of the mains flow in the mains fuel stages of the injectors. Thus, in contrast to the system shown in FIG. 1, the minimum flow through mains during pilot and mains operation does not have to be determined by a restriction in the fuel recirculating control valve, as this valve has a shut off position which prevents the cooling flow entering the delivery section through it during pilot and mains operation. Rather, the minimum flow through mains can be determined by the configuration of the splitting unit, allowing a smaller minimum flow through mains to be achieved. Advantageously, the diverted portion of the mains flow can still keep the recirculation line primed with relatively cool fuel, thereby preventing coking in the line. The splitting unit may be configured such that the minimum mains flow during pilot and mains operation is 20% or less of the total pilot+mains flow, and preferably 10% or less. The splitting unit may have a slidable spool, the position of the spool determining the flow split between an outlet of the splitting unit to the pilot manifold, an outlet of the splitting unit to the mains manifold, and an outlet of the splitting unit to the delivery section of the cooling flow recirculation line.

Such a splitting unit, configured to divert a portion of the mains flow into the delivery section during pilot and mains operation, could contribute to an increased pressure variation in the mains manifold during pilot-only operation due to increased leakage flow through the unit. However, the improved control of the fuel pressure in the mains manifold during pilot-only operation obtained by appropriate adjustment of the splitting unit can also help to counteract this pressure variation.

The fuel recirculating control valve may also be operable to assume the shut off position during pilot-only operation. This can be beneficial during a windmill relight situation to improve the likelihood of successful relight by directing all fuel flow to the pilot manifold and hence the pilot fuel stages of the injectors. In addition, if there is a failure at a mains fuel stage of an injector (e.g. failure of a mains flow scheduling valve), shutting off flow into the cooling flow recirculation line can prevent leakage into the combustor at that stage.

The delivery section may include a delivery manifold which distributes the cooling flow to the injectors en route to the mains manifold.

The pilot manifold may include a segment restrictable by a lean blow out protection valve to decrease the proportion of a pilot fuel flow delivered to the injectors fed by the segment relative to the total pilot fuel flow delivered to all the injectors of the combustor.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES

Figure 2:
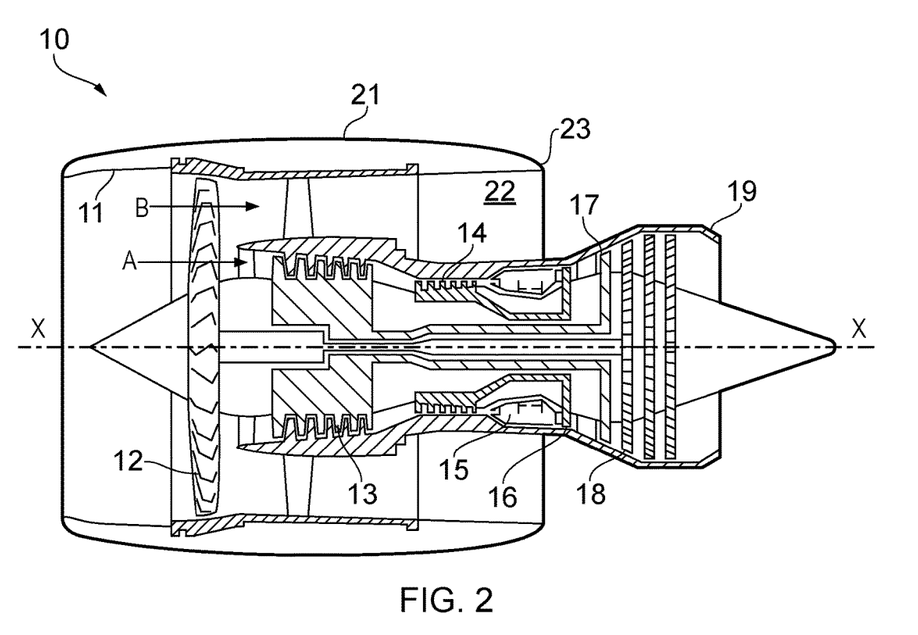
FIG. 2 shows a longitudinal cross-section through a ducted fan gas turbine engine.

With reference to FIG. 2, a ducted fan gas turbine engine incorporating the invention is generally indicated at 10 and has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate-pressure compressor 13 and a second air flow B which passes through the bypass duct 22 to provide propulsive thrust. The intermediate-pressure compressor 13 compresses the air flow A directed into it before delivering that air to the high-pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate-pressure compressors 14, 13 and the fan 12 by suitable interconnecting shafts.

The engine has a pumping unit comprising a low pressure (LP) pumping stage which draws fuel from a fuel tank of the aircraft and supplies the fuel at boosted pressure to the inlet of a high pressure (HP) pumping stage. The LP stage typically comprises a centrifugal impeller pump while the HP pumping stage may comprise one or more positive displacement pumps, e.g. in the form of twin pinion gear pumps. The LP and HP stages are typically connected to a common drive input, which is driven by the engine HP or IP shaft via an engine accessory gearbox.

A fuel supply system then accepts fuel from the HP pumping stage for feeds to the combustor 15 of the engine 10. This system typically has a hydro-mechanical unit (HMU) comprising a fuel metering valve operable to control the rate at which fuel is allowed to flow to the combustor. The HMU further typically comprises: a pressure drop control arrangement (such as a spill valve and a pressure drop control valve) which is operable to maintain a substantially constant pressure drop across the metering valve, and a pressure raising and shut-off valve at the fuel exit of the HMU which ensures that a predetermined minimum pressure level is maintained upstream thereof for correct operation of any fuel pressure operated auxiliary devices (such as variable inlet guide vane or variable stator vane actuators) that receive fuel under pressure from the HMU. Further details of such an HMU are described in EP 2339147 A.

An engine electronic controller (EEC) commands the HMU fuel metering valve to supply fuel to the combustor at a given flow rate. The metered fuel flow leaves the HMU and arrives at a staging system 30, shown schematically in FIG. 3 in pilot-only operation mode and in FIG. 4 in pilot and mains operation mode, at a pressure $P_{fmu}$.

Figure 3:
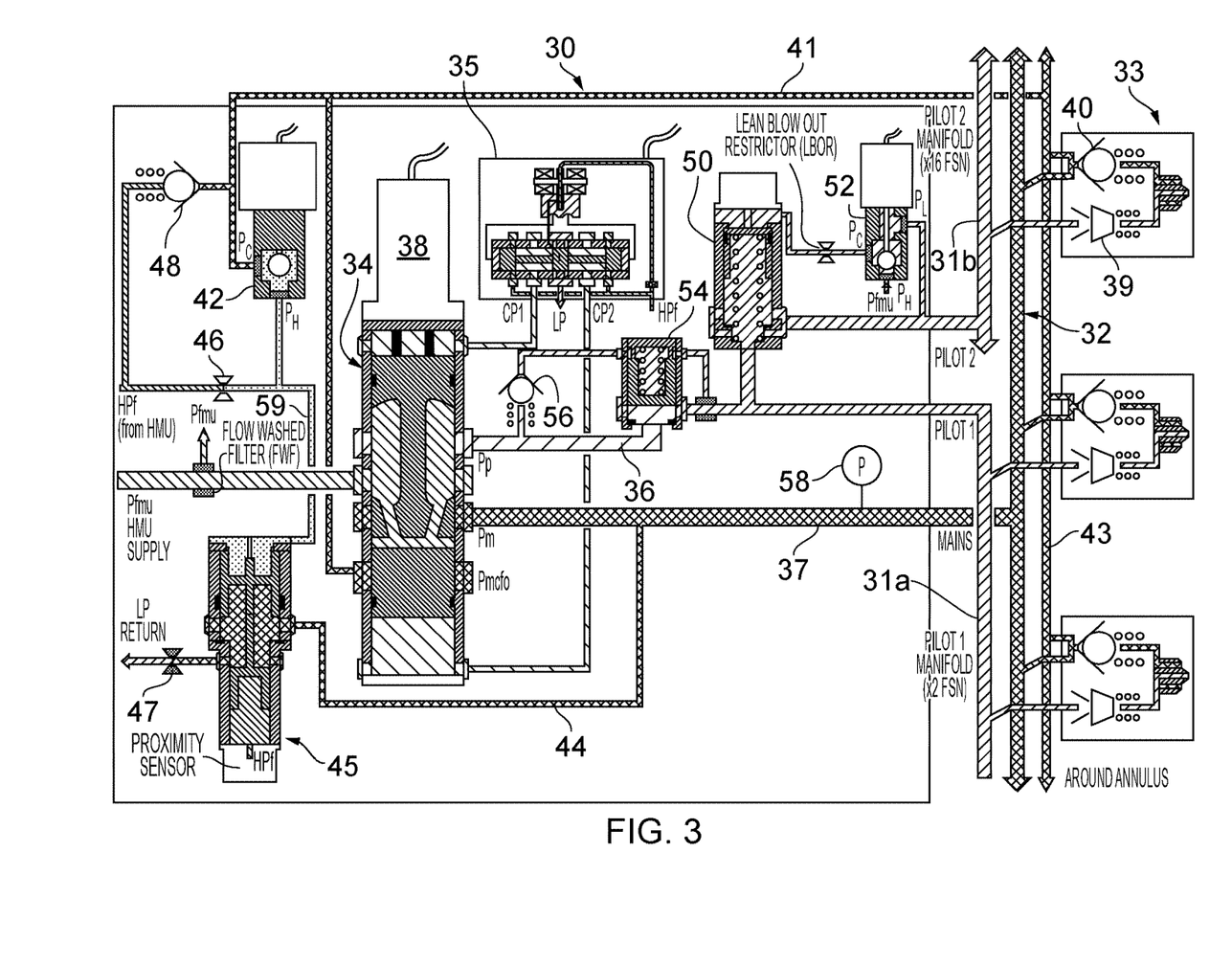
FIG. 3 shows schematically a combustion staging system for a gas turbine engine in pilot-only operation mode.
Figure 4:
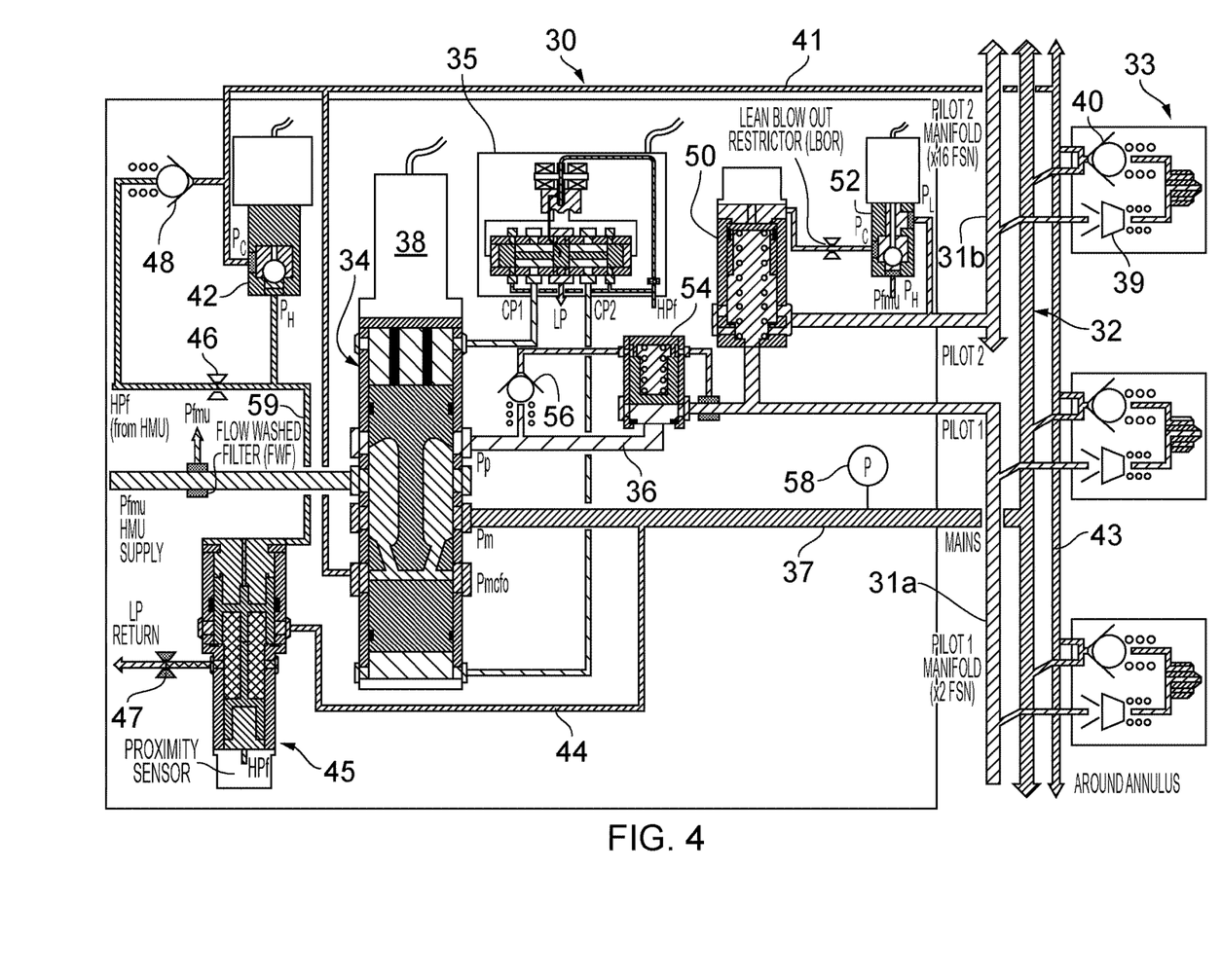
FIG. 4 shows schematically the combustion staging system of FIG. 3 in pilot and mains operation mode.

The staging system 30 splits the fuel into two flows: one at a pressure $P_p$ for first 31a and second 31b segments of a pilot manifold and the other at a pressure $P_m$ for a mains manifold 32. Fuel injectors 33 of a combustor of the engine are split into two groups. The injectors of one group are connected to the first pilot manifold segment 31a, while the injectors of the other group are connected to the second pilot manifold segment 31b. The mains manifold feeds secondary nozzles of the fuel injectors. Mains flow scheduling valves (FSVs) 40 at the injectors retain primed manifolds when de-staged and at shut-down.

A fuel flow splitting valve (FFSV) 34 receives the metered fuel flow from the HMU at pressure $P_{fmu}$. A spool is slidable within the FFSV under the control of a servo-valve 35, the position of the spool determining the outgoing flow split between outlets to, respectively, a pilot connection pipe 36 which delivers fuel to the pilot manifold segments 31a, b, a mains connection pipe 37 which delivers fuel to the mains manifold 32, and a delivery pipe 41 of a recirculation line (discussed below). The spool can be positioned (as shown in FIG. 3) so that the mains stage is completely deselected, with the entire metered flow going to the pilot stage. An LVDT 38 provides feedback on the position of the spool to an engine electronic controller (EEC), which in turn controls staging by control of the servo-valve.

Between the FFSV 34 and the second pilot manifold segment 31b, the pilot connection pipe 36 communicates with a lean blow out protection valve 50 which controls communication between the pilot connection pipe 36 and the second pilot manifold segment 31b. The lean blow out protection valve is spring biased towards an open position. A solenoid operated control valve 52 is operable to apply a control pressure to the valve member of the lean blow out protection valve to move it against the action of the spring biasing to a closed position, restricting the communication between the pilot connection pipe 36 and the second pilot manifold segment 31b, when required.

The recirculation line provides the mains manifold 32 with a cooling flow of fuel when the mains manifold is deselected in pilot-only operation mode (as shown in FIG. 3). The recirculation line has a delivery section including the delivery pipe 41 which receives the cooling flow from a cooling flow orifice (CFO) 46 and a fuel recirculating control valve (FRCV) 42, and a recirculation manifold 43 into which the delivery pipe feeds the cooling flow. The recirculation manifold has feeds which introduce the cooling flow from the recirculation manifold to the mains manifold via connections to the feeds from the mains manifold to the mains FSVs 40.

In addition, the recirculation line has a return section which collects the returning cooling flow from the mains manifold 32. The return section is formed by a portion of the mains connection pipe 37 and a branch pipe 44 from the mains connection pipe, the branch pipe extending to a recirculating flow return valve (RFRV) 45 from whence the cooling flow exits the recirculation line through a pressure raising orifice (PRO) 47.

At entry to the CFO 46, the cooling flow for the recirculation line (obtained from the HMU) is at a high pressure $HP_f$, and after exiting from the PRO 47 is returned to the pumping unit at a lower pressure LP for re-pressurisation by the HP pumping stage. Between the CFO and the PRO, the cooling flow in the mains manifold 32 is at an intermediate pressure, measured by a pressure sensor 58. Fine control of this pressure by the EEC is discussed in more detail below. A check valve 48 accommodates expansion of fuel trapped in the mains system during shutdown. The FRCV 42 and the RFRV 45 are operated under the control of the EEC. The HMU also supplies fuel at pressure $HP_f$ for operation of the servo-valve 35 and the RFRV 45.

During pilot-only operation (FIG. 3), the FRCV 42 adopts an open position to allow fuel to pass to the delivery pipe 41 from the CFO 46. The RFRV 45, which is operatively connected to the FRCV via connecting line 59, likewise moves to an open position to allow fuel to exit the branch pipe 44 through the PRO 47. When the mains is staged in (FIG. 4), the FRCV 42 moves to a shut off position which prevents the cooling flow entering the recirculation line therethrough, and similarly the RFRV moves to a shut off position. However, the spool of the FFSV 34 also moves to a position in which the outgoing flow from the FFSV is split between its outlets to the pilot connection pipe 36, the mains connection pipe 37, and the delivery pipe 41. In this way a portion of the mains flow is diverted into a relatively cool flow of fuel that is directed through the recirculation manifold 43 before going on to rejoin the rest of the mains flow at the FSVs 40. The flow keeps the recirculation manifold 43 filled with relatively cool fuel to avoid coking therein. Moreover, as the flow avoids the FRCV 42, the pressure drop through the FRCV can be eliminated. Advantageously, the FFSV 34 can be configured such that the minimum mains flow during pilot and mains operation is 20% or less, and preferably 10% or less of the total pilot+mains flow.

If one of the mains FSVs 40 fails open, the FRCV 42 can be closed so that no fuel is directed through the recirculation manifold 43. Thus there is no leakage through the failed valve into the combustion chamber during pilot-only operation, although the cooling effect of the recirculation manifold is therefore sacrificed.

In a windmill relight situation the FRCV 42 can also be closed so that no fuel is directed through the recirculation manifold 43 during pilot-only operation. Instead all the flow is directed through the segments 31a, b of the pilot manifold, which increases the available fuel for relight.

A failure mode associated with the system of FIG. 1 is that a pilot FSV 139 may fail partially staged in (i.e. stuck partially open) during a relatively low flow operating condition (i.e. pilot-only idle descent). A consequence of this failure scenario is that fuel flows constantly into the combustion chamber through the failed open pilot FSV, resulting in a reduction in fuel flow through the other pilot FSVs 139 in that manifold segment and possibly their closure due to the reduced pressure drop across them. A concern is that there will be hot streaks in the pilot stage of the combustor and resultant downstream turbine damage. Equivalent failure of a mains FSV 140 in the system of FIG. 1 is not believed to be as significant as mains flow enters the combustor through an annulus area of each injector 133 rather than the centred, and hence more concentrated, fuel flow from the pilot stage.

Advantageously, in the system of FIGS. 3 and 4, the pilot FSVs 139 are replaced with pilot weight distributor valves (WDVs) 39. In order to reduce or eliminate the above-mentioned hazard. WDVs are described in more detail in US 2010/0263755. Around the circumference of the combustion chamber the fuel manifold pressure head changes as a result of gravity. The WDVs operate to correct for the effects of such differential fuel manifold pressure head on the fuel distribution to the injectors 33. For injectors located in the lower sector of the combustion chamber the WDVs operate with the fuel pressure acting against a spring force (+valve piston mass), whereas in the upper sector of the combustion chamber they operate with the fuel pressure acting against the spring force (−valve piston mass). Trigonometry dictates the resultant forces acting on the WDVs for injectors located in the intermediate sectors of the combustion chamber. This arrangement results in a slight variation in fuel flow restriction at each injector position, which provides an improved injector-to-injector fuel flow distribution and associated engine operating characteristics.

The pilot WDVs 39 have a relatively low crack pressure and open fully at a low fuel flow, so that the difference between a failed open WDV and a correctly-functioning WDV is small. If one fails open it still works the same as an FSV in that as one is taking most of the flow, the flow through the others is reduced. However, as the WDVs are fully open at a much lower flow rate than FSVs it is possible to re-open the other WDVs more quickly, thereby avoiding hot streaks.

The staging system 30 has a balancing pressure check valve (BPCV) 54 on the pilot connection pipe 36. The BPCV maintains a pressure balance relative to the pressure in the mains manifold 32 for improved split control of the received fuel flow by the FFSV 34. More particularly, adopting the pilot WDVs 39 changes the fuel flow restriction to the injectors, potentially affecting the fuel flow split control. However, the BPCV cooperates with the mains FSVs 40 to maintain the necessary pressure balance, for example, during the pilot and mains operating mode illustrated in FIG. 4. The BPCV effectively replaces the pressure control of the pilot FSVs 139 of the system shown in FIG. 1, providing a variable restriction in parallel with the mains FSVs 40 so that the required pilot/mains split is achieved over the desired fuel flow range.

Locating the BPCV 54 upstream of the lean blow out protection valve 50 provides a flatter over-fuelling ratio to the injectors of the first pilot manifold segment 31a in the event of a lean blow out, making the engine more robust to engine flame-out during slam decelerations.

Figure 5:
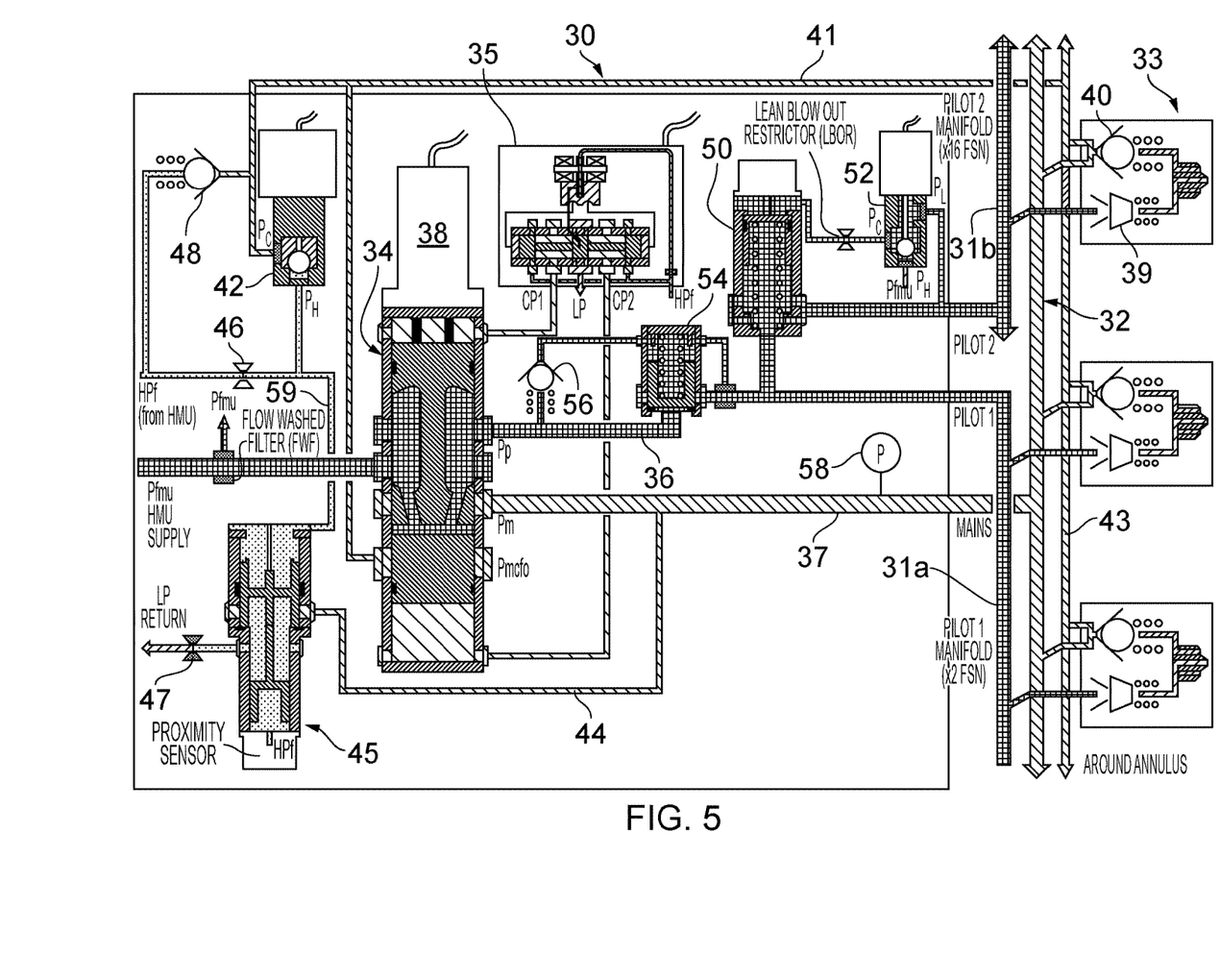
FIG. 5 shows schematically the combustion staging system of FIGS. 3 and 4 in shut down mode.

The BPCV 54 can also accommodate back-purge of the pilot manifold segments 31a, b via a back purge non-return valve 56 (although, alternatively, a direct line to a dump valve of the HMU and thence to a drains tank may be used). FIG. 5 shows schematically the staging system of FIGS. 3 and 4 in shut down mode. Boost pressure can be prevented from entering the manifolds 31a, 31b, 32 on shut down, for example by providing a robust spring-closed drip-tight seal in the RFRV 45, feeding the control valve 52 of the lean blow out protection valve 50 from $P_{fmu}$, making the BPCV 54 drip tight, and making the solenoid of the FRCV 42 drip tight. As a further precaution, $P_{fmu}$ rather than $HP_f$ can be used as a servo source pressure for the RFRV 45.

Figure 6:
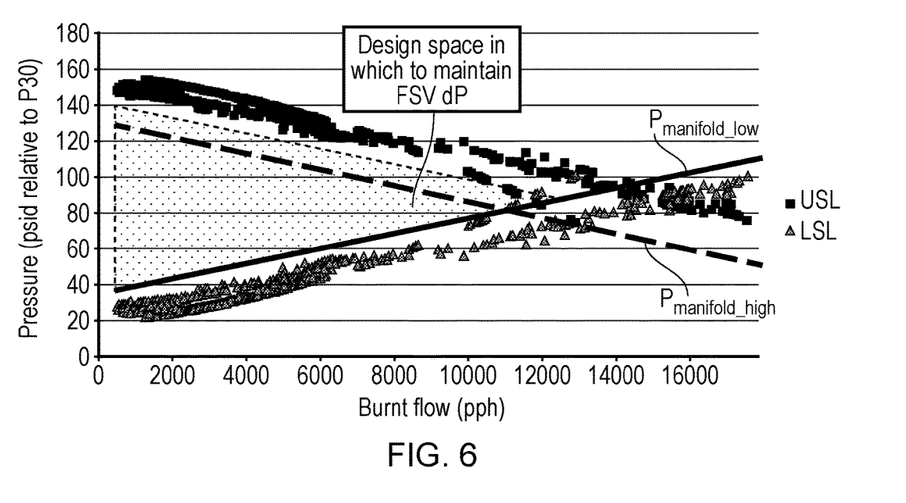
FIG. 6 shows a graph of mains manifold pressure relative to combustor gas pressure (P30) against metered fuel flow.

Returning to the control by the EEC of the fuel pressure in the mains manifold 32 during pilot-only operation, FIG. 6 shows a graph of mains manifold pressure relative to combustor gas pressure (P30) against metered fuel flow from the HMU. Plotted on the graph are data points (squares) each indicating a mains manifold pressure (i.e. the cracking pressure of the mains FSVs 40 less a percentage of the pressure to account for possible ripple) for a given flow rate above which fuel flows into the injector nozzle. Accordingly, up to about a flow rate of 13000 pph, the square data points represent an upper specification limit (USL) for the mains manifold fuel pressure during pilot-only operation. Also plotted on the graph are further data points (triangles) each indicating a mains manifold pressure for a given flow rate below which P30 gas can be ingested into the manifold. Thus, again up to about a flow rate of 13000 pph, the triangular data points represent a lower specification limit (LSL) for the mains manifold fuel pressure during pilot-only operation. Both sets of data points are determined from numerical modelling of the staging system 30 over a range of engine operational conditions.

Figure 7:
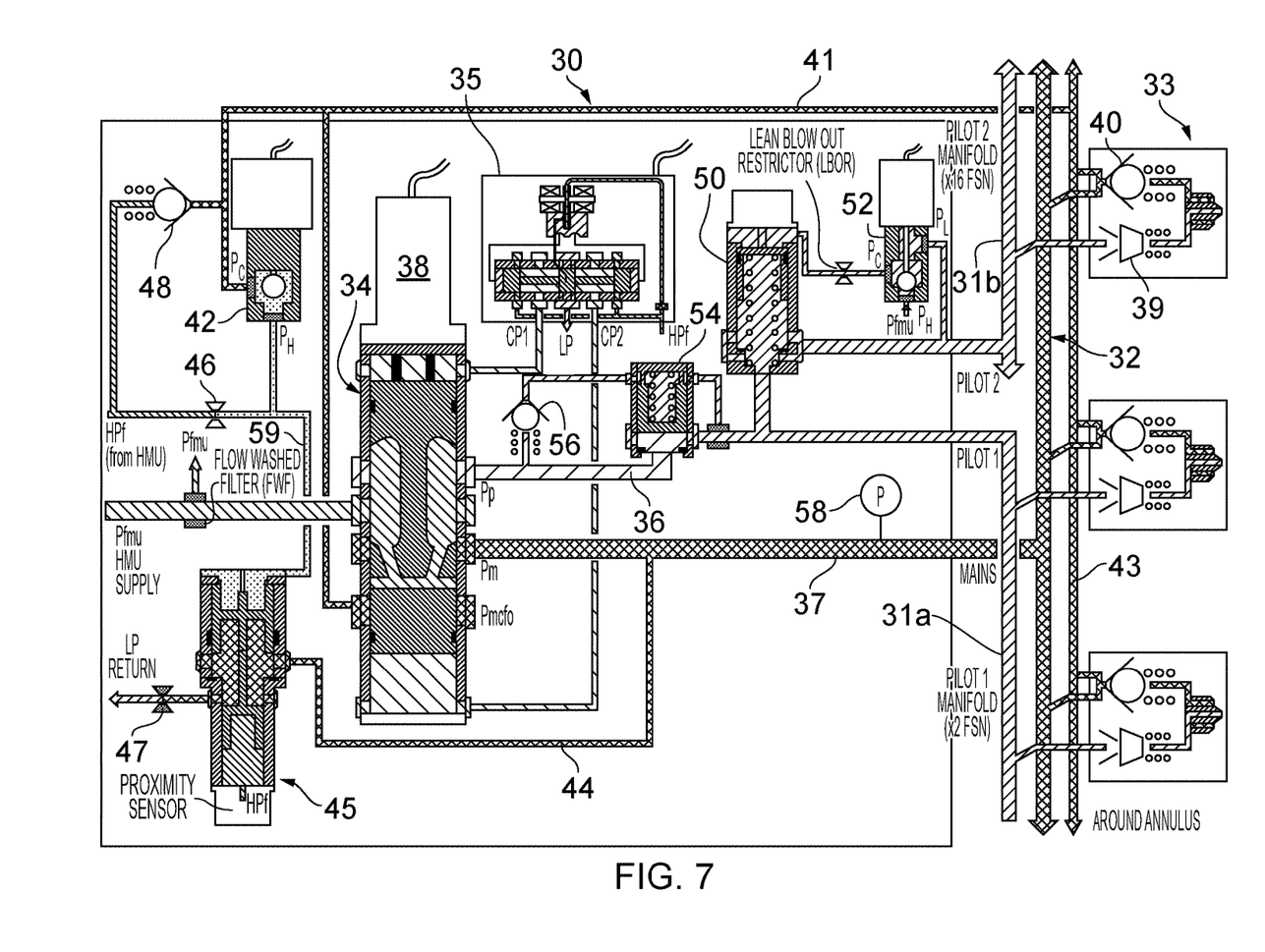
FIG. 7 shows schematically the combustion staging system of FIGS. 3 to 5 in pilot-only operation mode in which the splitting valve is adjusted to partially select the mains manifold.

Between these two limits, in the flow rate range from zero to about 13000 pph (5900 kg/h), a preferred design space (corresponding approximately to the shaded grey triangle in FIG. 6) can be defined in which the pressure difference across the mains FSVs 40 may be situated in order to avoid fuel leakage through the FSVs or to avoid P30 gas ingestion. FIG. 7 shows schematically the combustion staging system of FIGS. 3 to 5, again in pilot-only operation mode, but with the FFSV 34 adjusted under the control of the EEC to partially select the mains manifold. This partial selection enables fine control of the intermediate pressure P in the mains manifold, and hence the pressure difference across the mains FSVs. More particularly, the FFSV is adjusted by the EEC during pilot-only operation to feed a small, continuously variable amount of additional cooling flow into the recirculation line from the metered fuel flow at pressure $P_{fmu}$, thereby increasing the differential pressure (P−P30) across the mains FSVs. Typically the additional cooling flow is 2% or less (and preferably 1% or less) of the total metered flow received by the FFSV.

The following considerations are used to determine the position of the splitting valve 34. If 165 psid (1.14 MPa) is the minimum pressure at which the mains FSVs 40 will seal, then a maximum pressure ($P_{manifold\_high}$) for the mains manifold fuel pressure can be set at:

$$P_{manifold\_high} = P30 + 165 \text{ psid} - 10\% \times P_{manifold\_high}$$

whereby $P_{manifold\_high} = (P30 + 165 \text{ psid})/110\%$ and a minimum pressure ($P_{manifold\_low}$) for the mains manifold fuel pressure can be set at:

$$P_{manifold\_low} = P30 + 15\% \times P_{manifold\_low}$$

whereby $P_{manifold\_low} = P30/85\%$ the 10% and 15% values being respectively the expected high and low system pressure ripple amplitude as a percentage of the pressure in the manifold. Accordingly, the exact percentages may vary between implementations. Similarly, different minimum pressures than 165 psid may be applicable for different FSVs. On FIG. 6 the lines for $P_{manifold\_high}$ and $P_{manifold\_low}$ are respectively indicated by dashed and solid thick lines.

The FFSV 34 can be controlled by the EEC during pilot-only operation such that the mains manifold fuel pressure is above the solid thick line ($P_{manifold\_low}$) and preferably follows the thick dashed line ($P_{manifold\_high}$) until the lines cross at around 11000 pph (5000 kg/h), and thereafter follows or exceeds the solid thick line ($P_{manifold\_low}$). Below the LSL (triangular data points) there is a potential for combustion chamber gases to be ingested, which is a safety hazard. Above the USL (square data points) unmetered fuel can dribble into the combustion chamber, which increases coking and decreases component life but is not a safety hazard. Thus this control strategy avoids gas ingestion, even if at the expense of some dribble, but prevents dribble where possible.

The EEC can calculate a respective flow number for partial selection of the mains manifold 32 by the FFSV 34 required for each operating condition based on the target pressure, the estimated HP and LP pressures, and the flow numbers of the CFO 46 and the PRO 47. The EEC then adjusts the FFSV based on its nominal characteristic to achieve that flow number.

Moreover, the EEC can use feedback from the pressure sensor 58 to compensate for e.g. leakage through the FFSV 34, and variation in CFO and PRO characteristics. When there is a switch to pilots and mains operation (e.g. when there is no longer a need to control pressure in the mains manifold 32), the amount of compensation can be stored for use when the system reverts to pilot-only operation.

Advantageously, the control of the mains manifold pressure makes the selection of the CFO 46 and PRO 47 less critical.

If it is desired to use control of the FFSV 34 to reduce as well as increase the mains manifold fuel pressure during pilot-only operation, one option is to configure the system such that when there is no partial selection of the mains manifold (32) (i.e. as shown in FIG. 3), there is potential for combustor gas to be ingested into the system. For example, this could be achieved by appropriate sizing of the CFO 46 and the PRO 47. Partial selection of the mains manifold by the FFSV under the control of the EEC would then be performed to ensure that such ingestion does not in fact happen. Dual channel control of the FFSV can provide suitable fault accommodation, as both channels would need to fail to cause combustor gas ingress. Moreover, in case of such an event, the recirculation flow can be switched off, e.g. at the FRCV 42 and the RFRV 45, to prevent combustor gas reaching the low pressure side of the fuel system.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

All references referred to above are hereby incorporated by reference.

What is claimed is:

1. A combustion staging system for fuel injectors of a multi-stage combustor of a gas turbine engine, the combustion staging system comprising:
   a splitting unit that receives a total metered fuel flow and controllably splits the total metered fuel flow into a pilot flow and a mains flow for injecting respectively at a pilot fuel stage and a mains fuel stage of the fuel injectors to perform staging control of the multi-stage combustor; and
   a pilot fuel manifold and a mains fuel manifold respectively distributing fuel from the splitting unit to the pilot stage and the mains stage,
   wherein:
   the splitting unit is operable to select the pilot fuel manifold and deselect the mains fuel manifold for a pilot-only operation in which the pilot flow is supplied to the combustor and the mains flow is not supplied to the combustor from the fuel injectors, and the splitting unit is operable to select both the pilot fuel manifold and the mains fuel manifold for a pilot and mains operation in which the pilot flow and the mains flow are both supplied to the combustor from the fuel injectors;
   the combustion staging system further comprises a cooling flow recirculation line having (i) a delivery section arranged to provide a cooling flow of the fuel to the mains fuel manifold when the mains fuel manifold is deselected during the pilot-only operation so that the deselected mains fuel manifold remains primed with relatively cool fuel, and (ii) a return section arranged to collect the cooling flow of the fuel from the mains fuel manifold;
   the cooling flow of the fuel enters the delivery section from a high pressure fuel zone of the gas turbine engine and exits the return section to a low pressure fuel zone of the gas turbine engine; and
   the combustion staging system further comprises a controller configured to adjust the splitting unit during the pilot-only operation to partially select the mains fuel manifold so that a portion of the total metered fuel flow received by the splitting unit is fed into the cooling flow recirculation line to supplement the cooling flow of the fuel, thereby increasing a fuel pressure in the mains fuel manifold to meet a target fuel pressure in the mains fuel manifold.

2. The combustion staging system according to claim 1, wherein the controller is configured to select a value of the target pressure which ensures that the fuel pressure in the mains fuel manifold remains above a gas pressure in the combustor.

3. The combustion staging system according to claim 1, wherein the fuel injectors each have a mains check valve that is arranged to open when the fuel pressure in the mains fuel manifold exceeds a predetermined fuel pressure relative to a gas pressure in the combustor.

4. The combustion staging system according to claim 3, wherein the controller is configured to select a value of the target pressure during the pilot-only operation which ensures that the fuel pressure in the mains fuel manifold remains below the predetermined fuel pressure relative to the gas pressure in the combustor.

5. The combustion staging system according to claim 1, further comprising a pressure sensor that measures the fuel pressure in the mains fuel manifold, the controller performing feedback control based on the fuel pressure in the mains fuel manifold to meet the target fuel pressure.

6. The combustion staging system according to claim 1, wherein the controller is configured to adjust the splitting unit during the pilot-only operation to partially select the mains fuel manifold such that the maximum fuel How fed into the coding flow recirculation line from the splitting unit is 2% or of the total metered fuel flow received by the splitting unit.

7. The combustion staging system according to claim 1, wherein the cooling flow of the fuel enters the delivery section from the high pressure fuel zone of the gas turbine engine at a cooling flow orifice and exits the return section to the low pressure fuel zone of the gas turbine engine at a pressure raising orifice.

8. The combustion staging system according to claim 7, further comprising a fuel recirculating control valve on the delivery section located adjacent to the cooling flow orifice, the fuel recirculating control valve having an open position so that the cooling flow of the fuel enters the delivery section at the cooling flow orifice during the pilot-only operation, and a shut off position which prevents the cooling flow of the fuel from entering the delivery section through the cooling flow orifice during the pilot and mains operation.

9. The combustion staging system according to claim 7, further comprising a recirculating flow return valve located on the return section adjacent to the pressure raising orifice, the recirculating flow return valve having an open position so that the cooling flow of the fuel exits the return section at the pressure raising orifice during the pilot-only operation, and a shut off position which prevents the cooling flow of the fuel from exiting the return section through the pressure raising orifice during the pilot and mains operation.

10. The combustion staging system according to claim 1, wherein the splitting unit is configured to divert a portion of the total metered fuel flow into the delivery section during the pilot and mains operation, the diverted portion rejoining a remainder of the mains flow in the mains fuel stage of each of the fuel injectors.

11. The combustion staging system according to claim 10, wherein the splitting unit has a slidable spool, a position of the slidable spool determining a flow split between an outlet of the splitting unit to the pilot fuel manifold, an outlet of the splitting unit to the mains fuel manifold, and an outlet of the splitting unit to the delivery section of the cooling flow recirculation line.

12. The combustion staging system according to claim 1, wherein the delivery section includes a delivery manifold that distributes the cooling flow of the fuel to the fuel injectors en route to the mains fuel manifold.

13. The combustion staging system according to claim 1, wherein the pilot fuel manifold includes a segment restrictable by a lean blow out protection valve to decrease a proportion of the pilot flow delivered to the fuel injectors fed by the segment relative to a total pilot fuel flow delivered to all of the fuel injectors of the combustor.

14. A gas turbine engine having the combustion staging system according to claim 1.

* * * * *